United States Patent
Tanaka et al.

(10) Patent No.: US 7,488,550 B2
(45) Date of Patent: Feb. 10, 2009

(54) FUEL CELL WITH A SEAL MEMBER INTEGRALLY FORMED ON A METAL SEPARATOR

(75) Inventors: Hiroyuki Tanaka, Utsunomiya (JP); Tadashi Nishiyama, Shioya-gun (JP); Daisuke Okonogi, Shioya-gun (JP); Takaki Nakagawa, Utsunomiya (JP)

(73) Assignee: Honda Motor Co., Ltd, Tokyo (JP)

( * ) Notice: Subject to any disclaimer, the term of this patent is extended or adjusted under 35 U.S.C. 154(b) by 521 days.

(21) Appl. No.: 10/745,161

(22) Filed: Dec. 22, 2003

(65) Prior Publication Data

US 2004/0137304 A1   Jul. 15, 2004

(30) Foreign Application Priority Data

Dec. 25, 2002   (JP) ............... 2002-375441

(51) Int. Cl.
  *H01M 8/02*   (2006.01)
(52) U.S. Cl. .......................... 429/35; 429/36
(58) Field of Classification Search .............. 429/35–36
  See application file for complete search history.

(56) References Cited

U.S. PATENT DOCUMENTS

| | | | | |
|---|---|---|---|---|
| 5,424,144 A * | 6/1995 | Woods, Jr. ............... 429/35 |
| 6,337,120 B1 * | 1/2002 | Sasaki et al. ............... 428/66.4 |
| 6,440,597 B1 * | 8/2002 | Mizuno ....................... 429/34 |
| 6,610,435 B1 * | 8/2003 | Maruyama et al. ........... 429/34 |
| 6,649,097 B2 * | 11/2003 | Sasaki et al. ............... 264/102 |
| 6,815,115 B2 * | 11/2004 | Sugita et al. ................. 429/35 |
| 6,872,485 B2 * | 3/2005 | Inoue et al. ................... 429/34 |
| 6,884,537 B2 * | 4/2005 | Smith ........................... 429/36 |
| 7,005,208 B2 * | 2/2006 | Suenaga et al. ............. 429/36 |
| 7,008,584 B2 * | 3/2006 | Inoue et al. ................ 264/154 |
| 7,014,939 B2 * | 3/2006 | Suenaga et al. ............. 429/35 |
| 2002/0055032 A1 | 5/2002 | Wakahoi et al. |
| 2002/0117780 A1 | 8/2002 | Inoue et al. |
| 2002/0122970 A1 | 9/2002 | Inoue et al. |

FOREIGN PATENT DOCUMENTS

| | | | |
|---|---|---|---|
| JP | 2001-102072 | * | 4/2001 |
| JP | 2001-332276 | | 11/2001 |
| JP | 2002-141082 | | 5/2002 |
| JP | 2002-198071 | | 7/2002 |
| JP | 2002-231264 | | 8/2002 |

* cited by examiner

*Primary Examiner*—Mark Ruthkosky
(74) *Attorney, Agent, or Firm*—Lahive & Cockfield, LLP; Anthony A. Laurentano, Esq.

(57) ABSTRACT

A first seal member is provided integrally on a surface of a first metal separator. The first seal member includes a base portion provided integrally on the first metal separator, a columnar portion protruding from the base portion, and a curved edge portion provided on the columnar portion. The curved edge portion has a predetermined radius of curvature.

6 Claims, 9 Drawing Sheets

Prior Art

FUEL CELL WITH A SEAL MEMBER INTEGRALLY FORMED ON A METAL SEPARATOR

BACKGROUND OF THE INVENTION

1. Field of the Invention

The present invention relates to a fuel cell including an electrolyte electrode assembly, and metal separators for sandwiching the electrolyte electrode assembly. The electrolyte electrode assembly includes a pair of electrodes and an electrolyte interposed between the electrodes. In the fuel cell, fluid flow fields are formed on surfaces of the separators for supplying fluids such as a reactant gas and a coolant along surfaces of the separators. Each of the fluid flow fields is connected between a fluid supply passage and a fluid discharge passage.

2. Description of the Related Art

For example, a solid polymer electrolyte fuel cell employs a membrane electrode assembly (MEA) which includes two electrodes (anode and cathode), and an electrolyte membrane interposed between the electrodes. The electrolyte membrane is a polymer ion exchange membrane. The membrane electrode assembly is interposed between separators. The membrane electrode assembly and the separators make up a unit of a fuel cell (unit cell) for generating electricity. A predetermined number of the fuel cells are stacked together to form a fuel cell stack.

In the fuel cell, a fuel gas (reactant gas) such as a gas chiefly containing hydrogen (hydrogen-containing gas) is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. A gas chiefly containing oxygen (oxygen-containing gas) or air is supplied to the cathode. At the cathode, the hydrogen ions from the anode combine with the electrons and oxygen to produce water.

In the fuel cell, the fuel gas, the oxygen-containing gas, and the coolant flow through their dedicated fluid passages which are hermetically sealed for preventing gas or liquid leakages. Typically, seal members are interposed between the electrolyte electrode assembly and the separator for preventing leakages. Various types of seal members are known, for example, Japanese Laid-Open Patent Application No. 2001-332276 discloses a seal member shown in FIG. 9. The seal member includes an elastic base gasket 1 with a higher hardness of 70 to 90 degree and gaskets 2 with a lower hardness of 30 to 50 degree. The base gasket 1 is made of a synthetic rubber or a synthetic resin, and the gasket 2 is made of a synthetic rubber. The gaskets 2 are placed on both surfaces of the base gasket 1.

In the seal member of Japanese Laid-Open Patent Application No. 2001-332276, the gaskets 2 may be displaced undesirably on the base gasket 1. If the desired sealing function of the gaskets 2 can not be performed due to the positional displacement, leakage of the reactant gas (fuel gas and/or oxygen-containing gas) and coolant may occur.

In an attempt to address the problem, U.S. Patent Application Publication No. US2002/0122970A1 discloses a method for fabricating a seal-integrated separator. According to the disclosure, a separator body of a fuel cell and seal members on both surfaces of the separator body are formed integrally into one piece. In contrast to the technique in which seal members are separately provided on both surfaces of the separator body, or the technique in which the separator body is coated with seal members, in the seal-integrated separator of U.S. Patent Application Publication No. US2002/0122970A1, the seal members are positioned with a high degree of accuracy, and the number of steps for assembling the fuel cells is significantly reduced.

Typically, the seal members are formed in a lip shape. The seal members are tapered to have thin end portions. Therefore, even if the seal members and the separator body are formed into one piece, the desired sealing performance may not be achieved for the fuel cell in some automobile applications.

Specifically, positional displacement may occur at the end portions of the seal members due to vibrations during the travel of the vehicle and impacts at the time of sudden acceleration and sudden braking. The positional displacement reduces the contact area of the seal members. If the positional displacement occurs, it is difficult to maintain the desired sealing performance. In the case of the fuel cell using a metal separator, surfaces of the metal separator are deformed, distorted or warped easily. However, the end portions of the seal members can not be deformed in accordance with the deformation of the metal separator. Thus, the sealing pressure between the surfaces of the separator and the seal member is not maintained at a sufficient level for sealing.

If a plurality of fuel cells are stacked together to form a fuel cell stack, the positional displacement occurs easily at the end portions of the seal members. Consequently, the end portions of the seal members are tilted, the surface pressure applied to the seal members is reduced, and the contact area between the separator and the seal members is reduced. It is difficult to maintain the desired sealing performance.

SUMMARY OF THE INVENTION

A main object of the present invention is to provide a fuel cell having a seal member with a simple structure in which the sealing performance between the seal member and the metal separator is reliably maintained, and the desired power generation performance can be achieved.

According to the present invention, a seal member is provided integrally on a metal separator, around at least one of an electrode, a reactant gas supply passage, and a reactant gas discharge passage. The seal member includes a base portion provided integrally on the metal separator, a columnar portion protruding from the base portion, and a curved edge portion provided on the columnar portion. The curved edge portion has a predetermined radius of curvature.

Since the seal member includes the base portion, the columnar portion, and the curved edge portion in contact with the sealing area under pressure, the contact area between the seal member and the sealing area is large in comparison with the conventional seal member having a lip shape. Even if the metal separators are deformed due to the gas pressure in the fuel cell, or even if surfaces of the metal separators are corrugated, warped, or distorted, the desired sealing performance can be achieved.

When a plurality of the fuel cells are stacked to form a fuel cell stack, the toughness of the seal member against the positional displacement is improved. The curved edge portion of the seal member is in contact with the sealing area under pressure. When the sealing area is displaced laterally, the columnar portion of the seal member is deformed, and thus, the curved edge portion of the sealing member moves laterally together with the sealing area. When the fuel cell is mounted in a vehicle, the seal member is kept tightly in contact with the metal separator under pressure, and the anti-vibration and the anti-shock performance can be improved.

The aspect ratio (H/W) of the seal member is 1.5 or less. Therefore, when the fuel cells are stacked to form the fuel cell stack, it is unlikely that the curved edge portion of the seal member is deformed excessively, or tilted away from the sealing area. The toughness of the seal member against the positional displacement is improved.

The radius of curvature of the curved edge portion is ranging from 1.0 mm to 3.0 mm. If the radius of curvature is less than 1.0 mm, the columnar portion of the seal member may not be deformed in accordance with the movement of the sealing area, i.e., may not be deformed to compensate for offset of the sealing area. If the radius of curvature is greater than 3.0 mm, the curved edge portion is not compressed, and the desired sealing performance can not be achieved.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
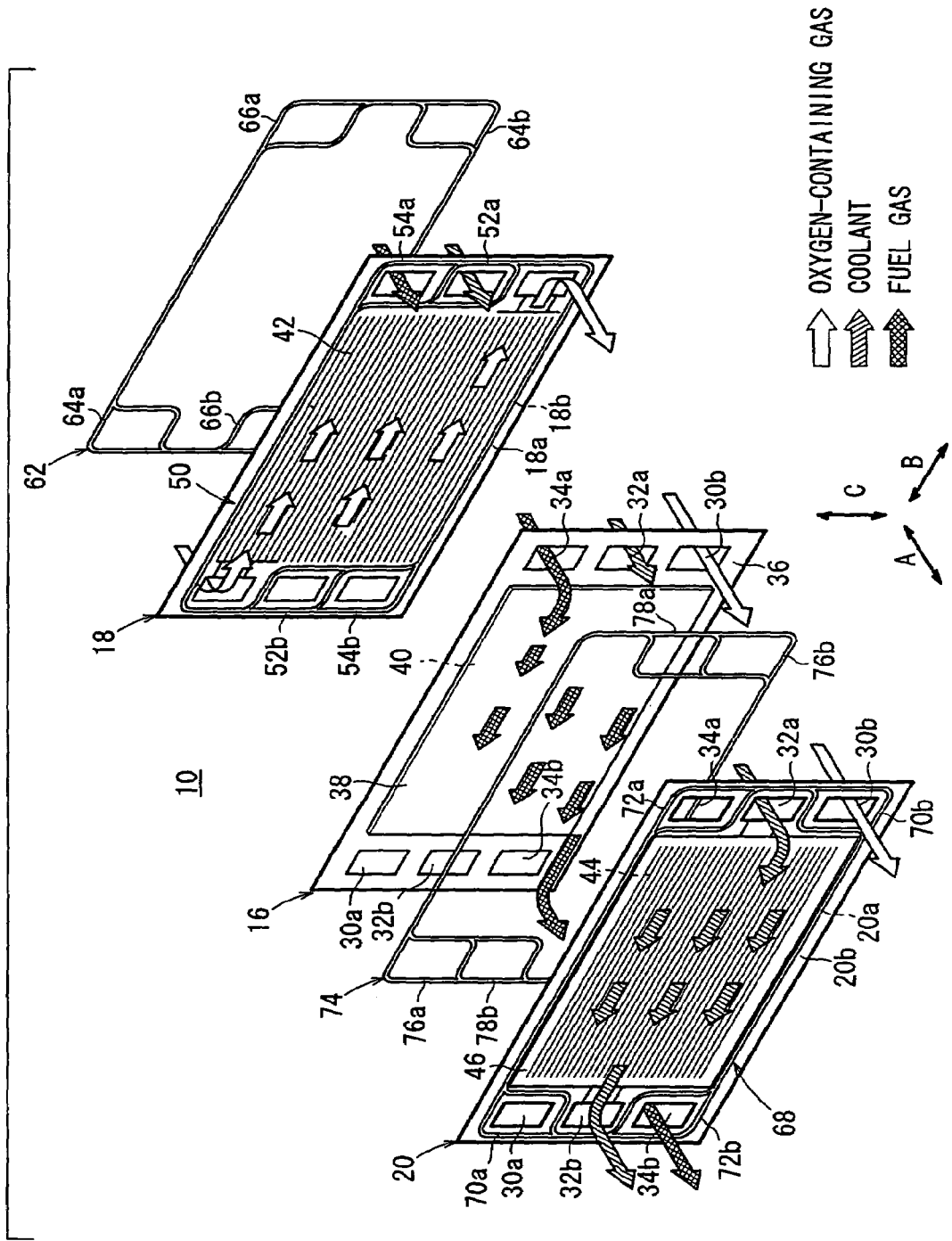
FIG. 1 is an exploded perspective view showing main components of a fuel cell according to an embodiment of the present invention.
Figure 2:
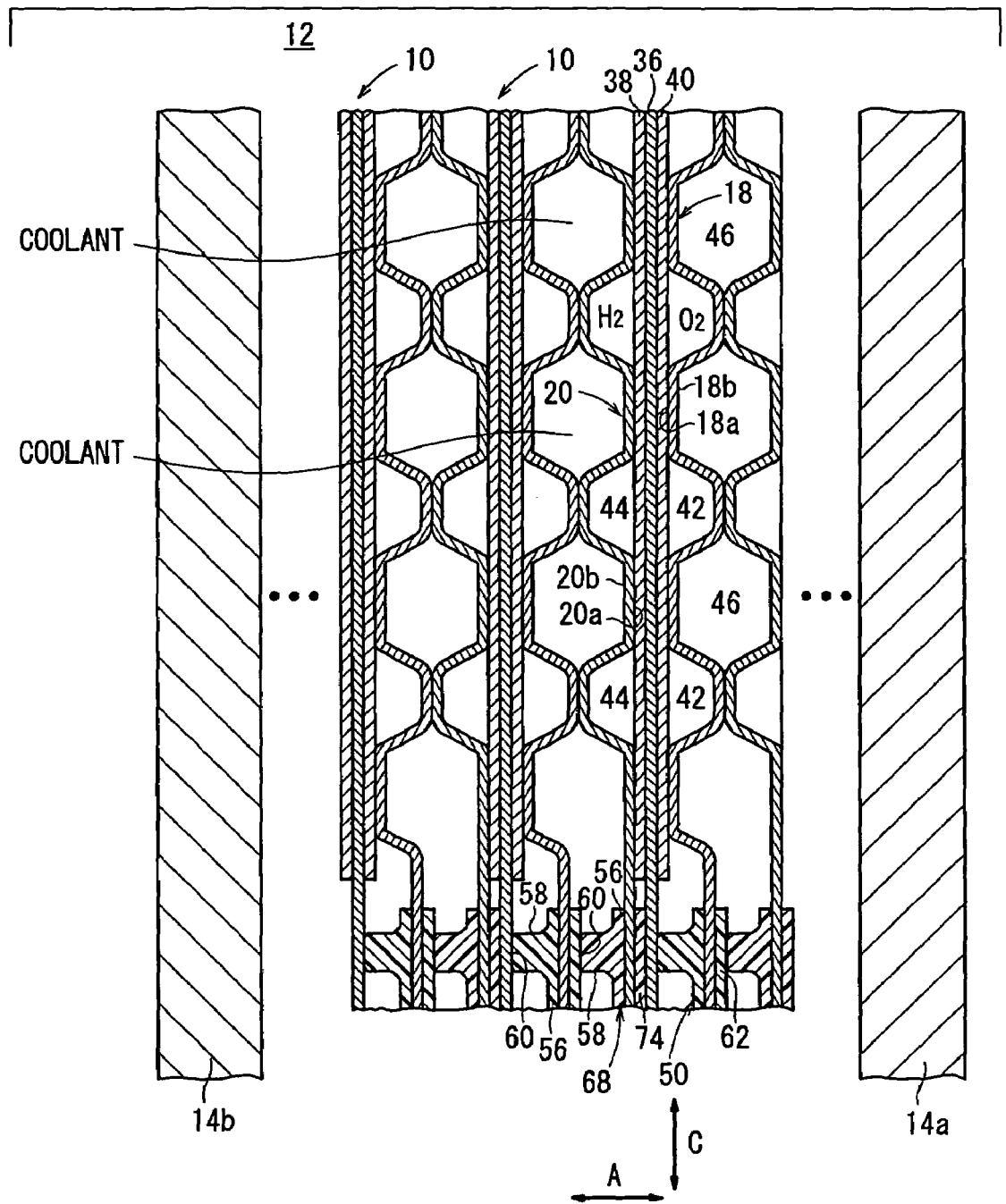
FIG. 2 is a cross sectional view showing main components of a fuel cell stack formed by stacking a plurality of the fuel cells.

FIG. 1 is an exploded view showing main components of a fuel cell 10 according to an embodiment of the present invention and FIG. 2 is a cross sectional view showing main components of a fuel cell stack 12 formed by stacking a plurality of the fuel cells 10.

As shown in FIG. 2, the fuel cell stack 12 is formed by stacking a plurality of the fuel cells 10 in a direction indicated by an arrow A. End plates 14a, 14b are provided at opposite ends of the fuel cell stack 12 in the stacking direction. The end plates 14a, 14b are fastened by tie rods (not shown) for tightening the fuel cells 10 with a predetermined tightening force in the direction indicated by the arrow A.

As shown in FIG. 1, the fuel cell 10 includes a membrane electrode assembly (electrolyte electrode assembly) 16 and first and second metal separators 18, 20 for sandwiching the membrane electrode assembly 16. The first and second metal separators 18, 20 are steel plates, stainless steel plates, aluminum plates, plated steel sheets, or metal plates having anti-corrosive surfaces by surface treatment. For example, the first and second metal separators 18, 20 have a thickness of 0.05 mm to 1.0 mm.

As shown in FIG. 1, at one horizontal end of the fuel cell 10 in a direction indicated by an arrow B, an oxygen-containing gas supply passage (reactant gas supply passage) 30a for supplying an oxygen-containing gas, a coolant discharge passage 32b for discharging a coolant, and a fuel gas discharge passage (reactant gas discharge passage) 34b for discharging a fuel gas such as a hydrogen-containing gas are arranged vertically in a direction indicated by an arrow C. The oxygen-containing gas supply passage 30a, the coolant discharge passage 32b, and the fuel gas discharge passage 34b extend through the fuel cell 10 in a stacking direction indicated by an arrow A.

At the other horizontal end of the fuel cell 10 in the direction indicated by the arrow B, a fuel gas supply passage (reactant gas supply passage) 34a for supplying the fuel gas, a coolant supply passage 32a for supplying the coolant, and an oxygen-containing gas discharge passage (reactant gas discharge passage) 30b for discharging the oxygen-containing gas are arranged vertically in the direction indicated by the arrow C. The fuel gas supply passage 34a, the coolant supply passage 32a, and the oxygen-containing gas discharge passage 30b extend through the fuel cell 10 in the direction indicated by the arrow A.

The membrane electrode assembly 16 comprises an anode 38, a cathode 40, and a solid polymer electrolyte membrane 36 interposed between the anode 38 and the cathode 40. The solid polymer electrolyte membrane 36 is formed by impregnating a thin membrane of perfluorosulfonic acid with water, for example.

Each of the anode 38 and cathode 40 has a gas diffusion layer such as a carbon paper, and an electrode catalyst layer of platinum alloy supported on carbon particles. The carbon particles are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively.

The first metal separator 18 has an oxygen-containing gas flow field (reactant gas flow field) 42 on its surface 18a facing the membrane electrode assembly 16. The oxygen-containing gas flow field 42 includes a plurality of grooves extending straight in the direction indicated by the arrow B, for example. The oxygen-containing gas flow field 42 is connected to the oxygen-containing gas supply passage 30a at one end, and connected to the oxygen-containing gas discharge passage 30b at the other end. As shown in FIGS. 1 and 2, the second metal separator 20 has a fuel gas flow field (reactant gas flow field) 44 on its surface 20a facing the membrane electrode assembly 16. The fuel gas flow field 44 includes a plurality of grooves extending in the direction indicated by the arrow B. The fuel gas flow field 44 is connected to the fuel gas supply passage 34a at one end, and connected to the fuel gas discharge passage 34b at the other end.

A coolant flow field 46 is formed between a surface 18b of the first metal separator 18 and a surface 20b of the second metal separator 20. The coolant flow field 46 includes a plurality of grooves extending straight in the direction indicated by the arrow B. The coolant flow field 46 is connected to the coolant supply passage 32a at one end, and connected to the coolant discharge passage 32b at the other end.

A first seal member 50 is formed integrally on the surface 18a of the first separator 18, around the cathode 40, i.e., around the oxygen-containing gas flow field 42, the oxygen-containing gas supply passage 30a, and the oxygen-containing gas discharge passage 30b. The first seal member 50 is made of seal material, cushion material or packing material such as EPDM (Ethylene Propylene Diene Monomer), NBR (Nitrile Rubber), fluoro rubber, silicon rubber, fluoro silicon fubber, butyl rubber (Isobutene-Isoprene Rubber), natural rubber, styrene rubber, chloroprene rubber, or acrylic rubber. The first seal member 50 has a hardness ranging from 30 degrees to 60 degrees.

The first seal member 50 includes a seal 52a for preventing leakage of the oxygen-containing gas from the oxygen-containing gas flow field 42 into the coolant supply passage 32a, a seal 52b for preventing leakage of the oxygen-containing gas from the oxygen-containing gas flow field 42 into the coolant discharge passage 32b. Further, the first seal member 50 includes a seal 54a for preventing leakage of the oxygen-containing gas from the oxygen-containing gas flow field 42 into the fuel gas supply passage 34a, and a seal 54b for preventing leakage of the oxygen-containing gas into the fuel gas discharge passage 34b. These seals 52a, 52b, 54a, 54b may be formed integrally into one piece. Alternatively, these seals 52a, 52b, 54a, 54b may be formed separately.

Figure 3:
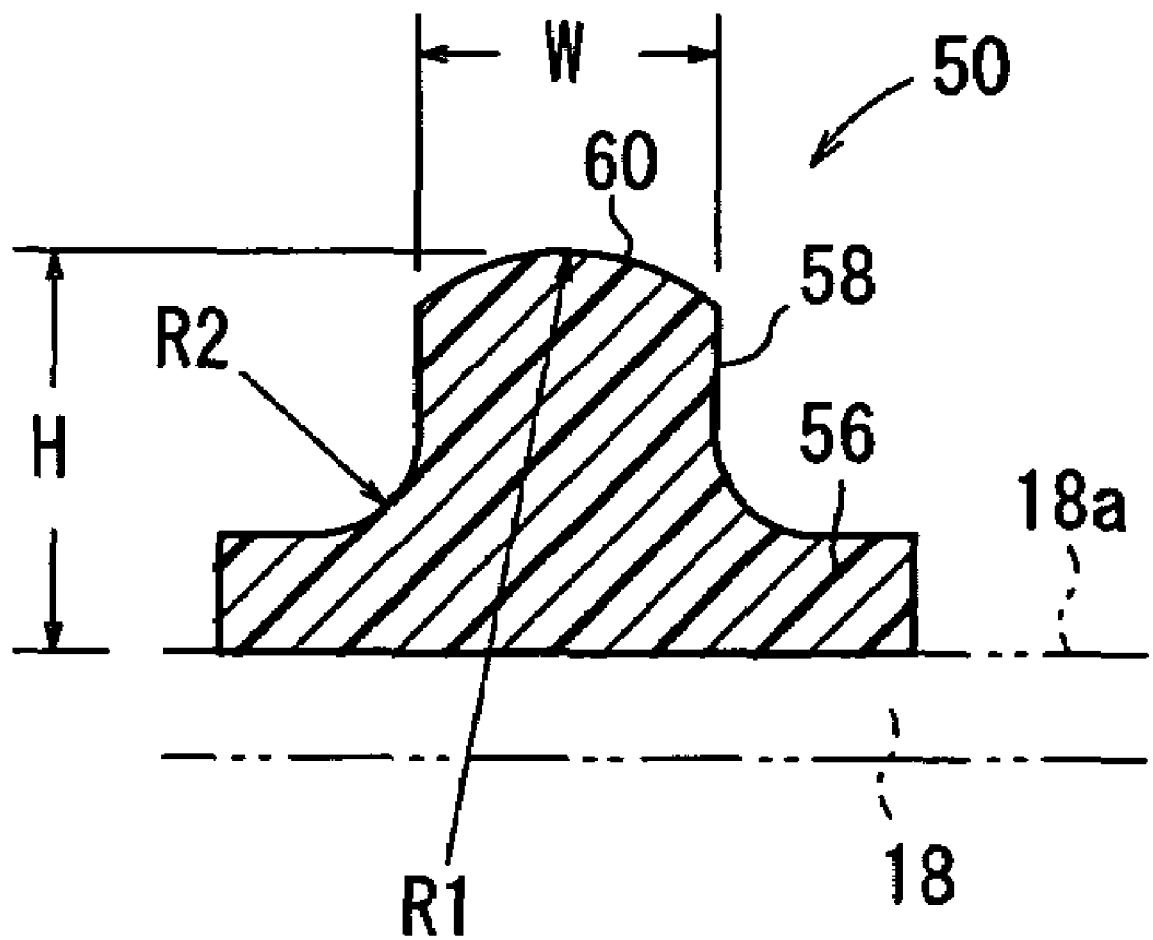
FIG. 3 is a cross-sectional view showing a seal member of the fuel cell.

As shown in FIG. 3, the first seal member 50 includes a base portion 56 formed integrally on the surface 18a of the first separator 18, and a columnar portion 58 having a columnar cross section, and a curved edge portion 60 having a curved cross section with a predetermined radius of curvature. The columnar portion 58 protrudes from the base portion 56, and the curved edge portion 60 is formed on the columnar portion 58. The columnar portion 58 protrudes from the base portion 56 with a small draft angle. The draft angle is produced at the time of molding.

The radius of curvature R1 of the curved edge portion 60 is ranging from 1.0 mm to 3.0 mm. The sealing width of the curved edge portion 60 is 1.0 mm or greater. When the curved edge portion 60 is in contact with the solid polymer electrolyte membrane 36 for pressing the surface 20a of the second separator 20, the width of the contact area is 1.5 mm or greater. The aspect ratio of the first seal member 50 is not more than 1.5, i.e., H/W≦1.5 (where W is the width of the columnar portion 58, and H is the height from the base portion 56 to the curved edge portion 60). The radius of curvature R2 of the base portion 56 is ranging from 0.3 mm to 1.0 mm for preventing stress concentration between the columnar portion 58 and the base portion 56.

As shown in FIGS. 1 and 2, a second seal member 62 is formed integrally on the surface 18b of the first separator 18, around the coolant flow field 46, the coolant supply passage 32a, and the coolant discharge passage 32b. The second seal member 62 includes a seal 64a for preventing leakage of the coolant from the coolant flow field 46 into the oxygen-containing gas supply passage 30a, a seal 64b for preventing leakage of the coolant from the coolant flow field 46 into the oxygen-containing gas discharge passage 30b. Further, the second seal member 62 includes a seal 66a for preventing leakage of the coolant from the coolant flow field 46 into the fuel gas supply passage 34a, and a seal 66b for preventing leakage of the coolant from the coolant flow field 46 into the fuel gas discharge passage 34b. These seals 64a, 64b, 66a, 66b may be formed integrally into one piece. Alternatively, these seals 64a, 64b, 66a, 66b may be formed separately. The second seal member 62 has a rectangular cross section.

A third seal member 68 is formed integrally on the surface 20b of the second separator 20, around the coolant flow field 46, the coolant supply passage 32a, and the coolant discharge passage 32b. The third seal member 68 includes a seal 70a for preventing leakage of the coolant from the coolant flow field 46 into the oxygen-containing gas supply passage 30a, a seal 70b for preventing leakage of the coolant from the coolant flow field 46 into the oxygen-containing gas discharge passage 30b. Further, the third seal member 68 includes a seal 72a for preventing leakage of the coolant from the coolant flow field 46 into the fuel gas supply passage 34a, and a seal 72b for preventing leakage of the coolant from the coolant flow field 46 into the fuel gas discharge passage 34b.

The third seal member 68 has the same structure with the first seal member 50. The constituent elements of the third seal member 68 that are identical to those of the first seal member 50 are labeled with the same reference numeral, and description thereof is omitted.

A fourth seal member 74 is formed integrally on the surface 20a of the second separator 20, around the anode 38, i.e., around the fuel gas flow field 44, the fuel gas supply passage 34a, and the fuel gas discharge passage 34b.

The fourth seal member 74 includes a seal 76a for preventing leakage of the fuel gas from the fuel gas flow field 44 into the oxygen-containing gas supply passage 30a, a seal 76b for preventing leakage of the fuel gas from the fuel gas flow field 44 into the oxygen-containing gas discharge passage 30b. Further, the fourth seal member 74 includes a seal 78a for preventing leakage of the fuel gas from the fuel gas flow field 44 into the coolant supply passage 32a, and a seal 78b for preventing leakage of the fuel gas into the coolant discharge passage 78b. The fourth seal member 74 has a rectangular cross section as with the second seal member 62.

Next, operation of the fuel cell 10 will be described.

In operation, as shown in FIG. 1, a fuel gas such as a hydrogen-containing gas is supplied to the fuel gas supply passage 34a, an oxygen-containing gas such as air is supplied to the oxygen-containing gas supply passage 30a, and a coolant such as pure water, an ethylene glycol or an oil are supplied to the coolant supply passage 32a.

The fuel gas flows from the fuel gas supply passage 34a into the fuel gas flow field 44 of the second metal separator 20. The fuel gas flows in the direction indicated by the arrow B along the anode 38 of the membrane electrode assembly 16 to induce a chemical reaction at the anode 38. The oxygen-containing gas flows from the oxygen-containing gas supply passage 30a into the oxygen-containing gas flow field 42 of the first metal separator 18. The oxygen-containing gas flows in the direction indicated by the arrow B along the cathode 40 of the membrane electrode assembly 16 to induce a chemical reaction at the cathode 40.

In the membrane electrode assembly 16, the fuel gas supplied to the anode 38, and the oxygen-containing gas supplied to the cathode 40 are consumed in the electrochemical reactions at catalyst layers of the anode 38 and the cathode 40 for generating electricity.

After the fuel gas is consumed at the anode 38, the fuel gas flows into the fuel gas discharge passage 34b, and flows in the direction indicated by the arrow A. Similarly, after the oxygen-containing gas is consumed at the cathode 40, the oxygen-containing gas flows into the oxygen-containing gas discharge passage 30b, and flows in the direction indicated by the arrow A.

The coolant supplied to the coolant supply passages 32a flows into the coolant flow field 46 between the first and second metal separators 18, 20, and flows in the direction indicated by the arrow B. After the coolant is used for cooling the membrane electrode assembly 16, the coolant is discharged into the coolant discharge passages 32b.

In the embodiment of the present invention, the first seal member 50 is formed integrally on the surface 18a of the first metal separator 18. As shown in FIG. 3, the first seal member 50 includes the base portion 56 formed integrally on the first separator 18, the columnar portion 58 protruding from the base portion 56, and the curved edge 60 provided on the columnar portion 58.

Thus, the area of contact between the first seal member 50 and the sealing area (solid polymer electrolyte membrane 36) is large in comparison with the conventional seal member having a lip shape. Thus, even if the first and second metal separators 18, 20 are deformed due to the gas pressure in the fuel cell 10, or surfaces of the metal separators 18, 20 are corrugated, warped, or distorted, the desired sealing performance can be maintained.

Further, when a plurality of the fuel cells 10 are stacked together to form the fuel cell stack 12, the first seal member 50 has the toughness. The positional displacement of the first seal member 50 does not occur. When the curved edge portion 60 of the first seal member 50 is pressed against the sealing area, the columnar portion 58 of the first seal member 50 is deformed to compensate for the movement of the sealing area so that the curved edge 60 moves together with the sealing area.

Thus, when the fuel cell stack 12 is mounted on a vehicle, the first seal member 50 is reliably in contact with the sealing area, absorbing vibrations while the vehicle is traveling, and shocks at the time of sudden braking and sudden acceleration. The anti-vibration capability and anti-shock capability of the fuel cell stack 12 are improved.

The radius of curvature R1 of the curved edge portion 60 is ranging from 1.0 mm to 3.0 mm. The modulus of elasticity is low so that the curved edge portion 60 can be tightly in contact with the sealing area. If the radius of curvature R1 is less than 1.0 mm, the columnar portion 58 of the first seal member 50 can not be deformed to compensate for the offset of sealing area. If the radius of curvature R1 is greater than 3.0 mm, the curved edge portion 60 can not be compressed sufficiently, and the desired sealing performance is not achieved.

The seal width of the curved edge portion is 1.0 mm or greater, and the width of contact area between the curved edge portion 60 and the sealing area when the curved edge portion 60 is compressed under pressure is 1.5 mm or greater. Thus, the sealing performance of the first seal member 50 is maintained even if the first and second metal separators 18, 20 are deformed. The toughness against the positional displacement when the fuel cells 10 are stacked to form the fuel cell stack 12 is improved. Further, the anti-vibration capability and anti-shock capability of the fuel cell stack 12 in the automobile application are improved.

The aspect ratio (H/W) of the first seal member 50 is 1.5 or less. Therefore, when the fuel cells 10 are stacked to form the fuel cell stack 12, the curved edge portion 60 of the first seal member 50 is not tilted easily. The toughness of the first seal member 50 against the positional displacement is improved.

The radius of curvature R2 at the corner between the base portion 56 and the columnar portion 58 is ranging from 0.3 mm to 1.0 mm. Thus, the stress is not concentrated at the base portion 56 when the first seal member 50 is compressed. The radius of the curvature R2 at the corner of the base portion 56 is 0.3 mm or greater. Thus, the stress applied to the base portion 56 is efficiently distributed for preventing cracks from being formed in the first seal member 50. The radius of curvature R2 at the corner of the base portion 56 is 1.0 mm or less. Thus, the first seal member 50 can be deformed to compensate for the lateral movement of the sealing surface.

The third seal member 68 has the same structure with the first seal member 50, and thus, description of the third seal member 68 is omitted.

Figure 4:
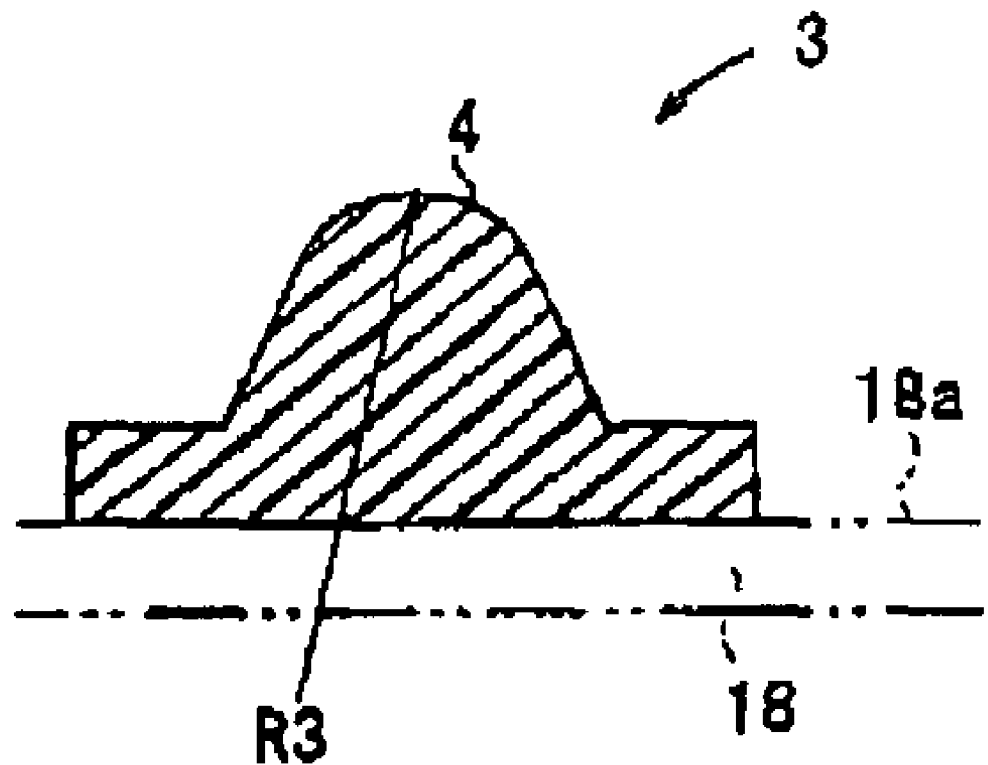
FIG. 4 is a cross-sectional view showing a part of a conventional seal member having a lip shape.

An experiment was carried out for comparing sealing performance of a conventional seal member 3 having a lip shape and sealing performance of the seal member according to the present embodiment. As shown in FIG. 4, the seal member 3 had a tapered shape, and the radius of curvature R3 of the curved edge portion 4 of the seal member 3 was ranging from 0.1 mm to 0.3 mm.

Figure 5:
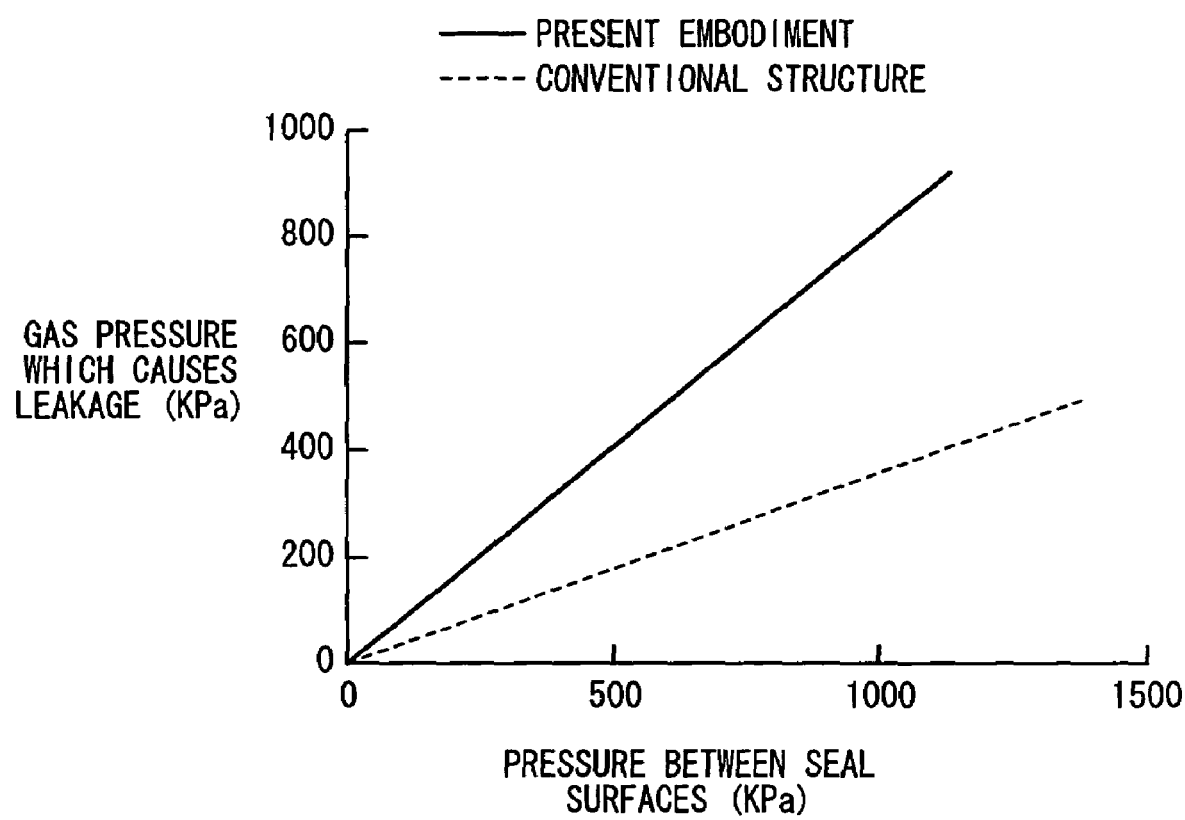
FIG. 5 is a graph showing relationship between pressure applied to seal surfaces and gas pressure which causes leakage in each of the conventional structure and the present embodiment.

The conventional fuel cell stack was formed by stacking a pair of fuel cells 10 each including the seal member 3. Further, the fuel cells 10 including the seal member according to the present embodiment were stacked to form the fuel cell 12. In the seal member according to the present embodiment, the radius of curvature R1 of the curved edge portion 60 was 1.5 mm, and the aspect ratio H/W of the seal member was 1.2. A helium gas was used for applying a gas pressure to the anode 38. Relationship between pressure applied to seal surfaces, and gas pressure which causes leakage is shown in FIG. 5. The seal members used in the experiments as described later with reference to FIGS. 6 through 8 were similar to the seal member used in this experiment.

In the conventional structure, when the first and second metal separators 18, 20 were deformed due to the difference between the gas pressure applied to the first metal separator 18 and the gas pressure applied to the second metal separator 20, the sealing performance was lowered significantly. In the present embodiment, the first and third seal members 50, 68 each having the base portion, the columnar portion, and the curved edge portion are used. Even if the first and second separators 18, 20 were deformed due to the difference in the gas pressure, the first and second seal members 50, 68 were deformed to compensate for the deformation of the first and seal separators 18, 20. Thus, the sealing performance of the present embodiment was considerably better than the sealing performance of the conventional structure.

In the next experiment, the first seal member 50 was offset by 0.25 mm on the separator surface, and the seal member 3 was offset by 0.20 mm on the separator surface. The pressure which causes leakage was detected in each of the present embodiment and the conventional structure.

Figure 6:
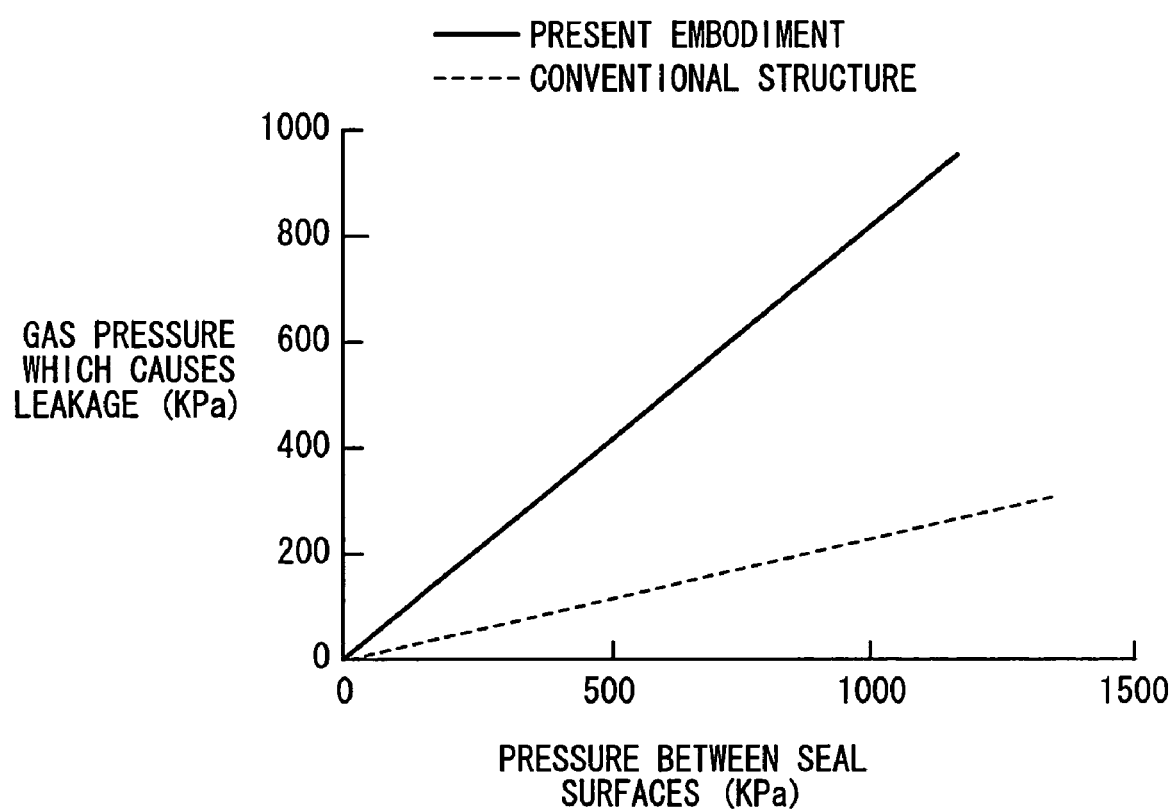
FIG. 6 is a graph showing relationship between pressure applied to seal surfaces and gas pressure which causes leakage when the seal member was offset in each of the conventional structure and the present embodiment.

As shown in FIG. 6, in the conventional structure, the offset of the seal member 3 caused the significant deterioration in the sealing performance. In contrast, in the present embodiment, the offset of the first seal member 50 did not cause any significant deterioration in the sealing performance. The first seal member 50 was deformed to reliably compensate for the offset.

Figure 7:
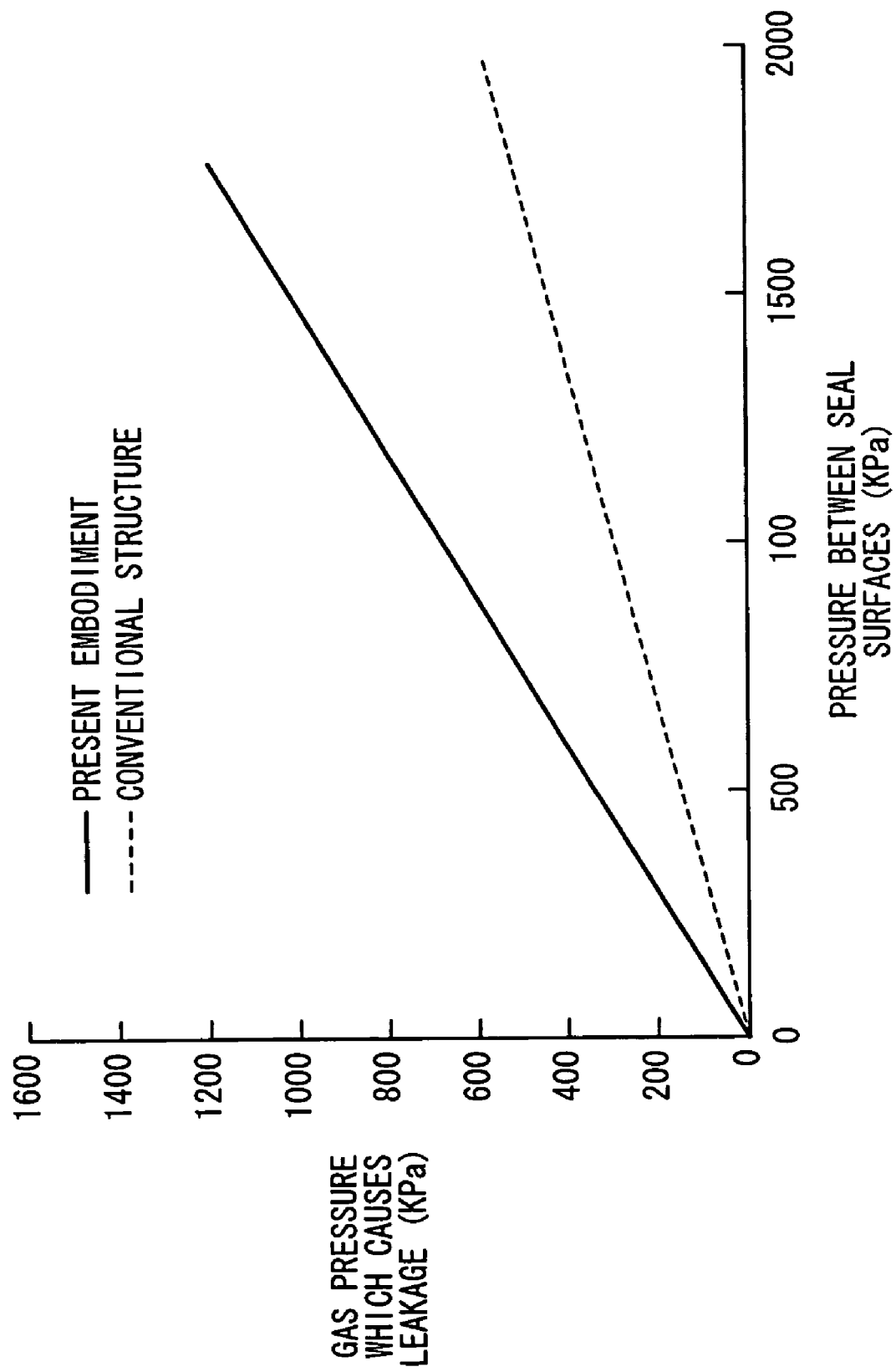
FIG. 7 is a graph showing relationship between pressure applied to seal surfaces and gas pressure which causes leakage when corrugated separators were used in each of the conventional structure and the present embodiment.

In the next experiment, corrugated plates with a rise of 0.2 mm and a pitch of 10 mm were used for the first and second metal separators 18, 20. The pressure which causes leakage was detected in each of the present embodiment and the conventional structure. The result of the experiment is shown in FIG. 7. As shown in FIG. 7, in the conventional structure, the corrugated surfaces of the first and second metal separators 18, 20 caused the significant deterioration in the sealing performance. In contrast, in the present embodiment, the corrugated surfaces of the first and second metal separators 18, 20 did not cause any significant deterioration in the sealing performance. The seal members of the present embodiment were deformed to reliably compensate for the corrugated surfaces.

In the next experiment, a shear load was applied to the fuel cell stack 12, on a surface perpendicular to the stacking direction of the fuel cell stack 12. Likewise, a shear load was applied to the conventional fuel cell stack, on a surface perpendicular to the stacking direction of the conventional fuel cell stack. The positional displacement of the seal members in the direction in which the shear load was applied, was detected in each of the present embodiment and the conventional structure.

Figure 8:
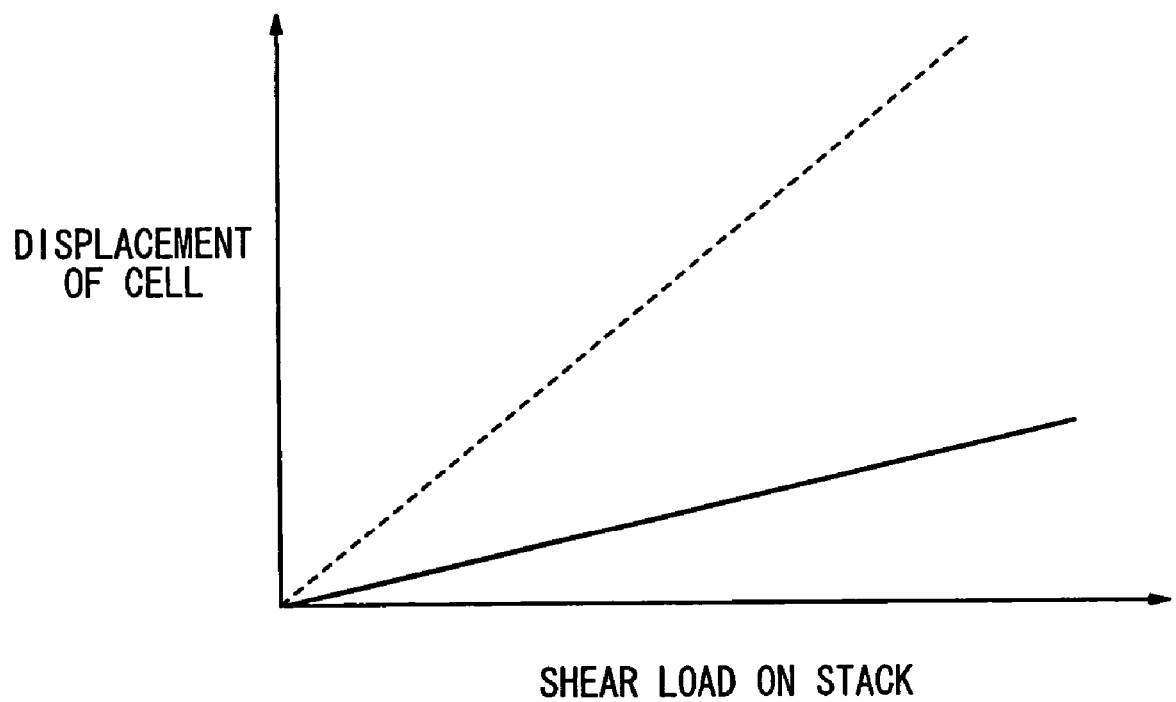
FIG. 8 is a graph showing relationship between displacement of cell and shear load applied on fuel cell stack in each of the conventional structure and the present embodiment.
Figure 9:
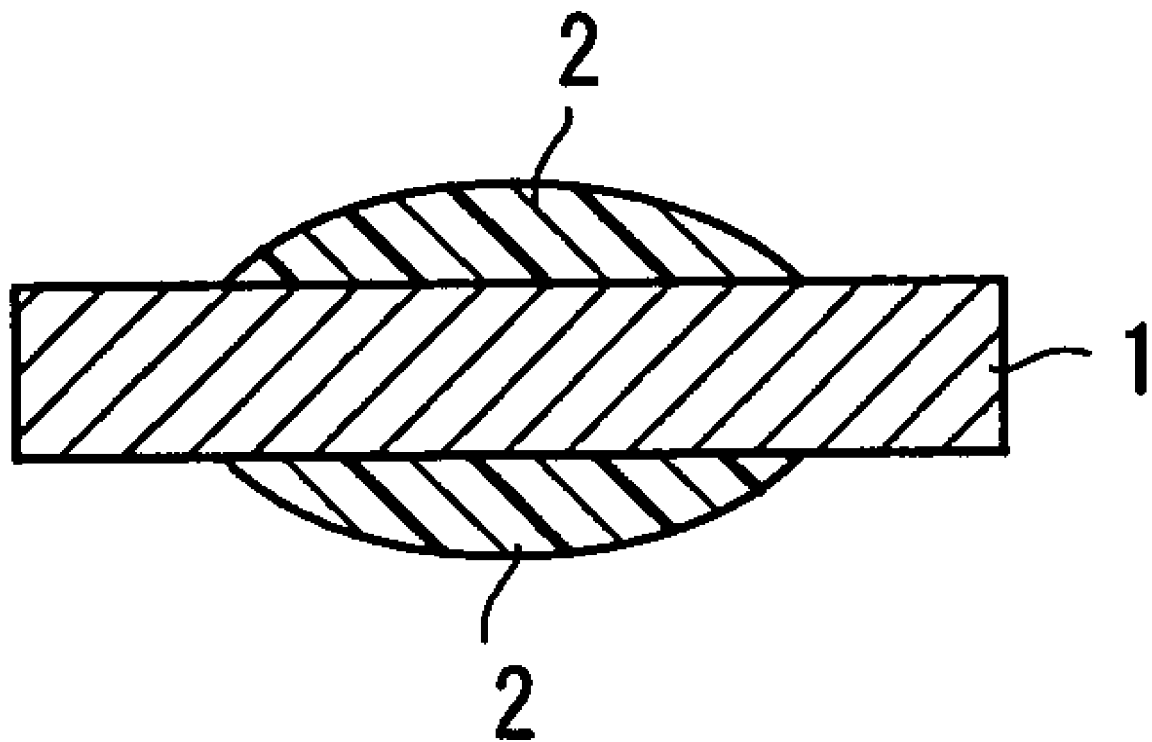
FIG. 9 is a cross sectional view showing a conventional seal member.

The result of the experiment is shown in FIG. 8. As shown in FIG. 8, the seal members 3 having a lip shape did not have the toughness against the shear load. The positional displacement of the seal members 3 was large. In contrast, the first and third seal members 50, 68 of the present embodiment had the toughness against the shear load. The first and third seal members 50, 68 were not displaced significantly.

In the fuel cell according to the present invention, the seal member has the base portion, the columnar portion, and the curved edge portion. Therefore, in contrast to the conventional seal member having a lip shape, the contact area with the metal separator is large. Thus, even if the metal separators are deformed, or surfaces of the metal separators are corrugated, warped, or distorted, the sealing performance is not deteriorated.

When the fuel cells are stacked to form a fuel cell stack, the toughness of the seal member against the positional displacement is improved. The curved edge portion of the seal member is in contact with the metal separator under pressure, the curved edge portion of the seal member move laterally together with the metal separator. Thus, when the fuel cell is mounted in a vehicle, the seal member is kept tightly in contact with the metal separator under pressure, and the anti-vibration and the anti-shock performance can be improved.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell, comprising:
   an electrolyte electrode assembly including a pair of electrodes and an electrolyte interposed between said electrodes; and
   metal separators for sandwiching said electrolyte electrode assembly,
   wherein a reactant gas supply passage, and a reactant gas discharge passage extend through said fuel cell in a stacking direction of said fuel cell;
   a reactant gas flow field is connected between said reactant gas supply passage and said reactant gas discharge passage on at least one of said metal separators along a surface of said electrode; and
   a seal member provided integrally on said metal separator, around at least one of said electrode, said reactant gas supply passage, and said reactant gas discharge passage,
   said seal member including:
   a substantially flat base portion formed integrally on said metal separator;
   a columnar portion, narrower than the base portion, protruding from said base portion, wherein the columnar portion is attached to the base portion by a curved transition region; and
   a curved edge portion provided on an end of said columnar portion, and having a predetermined curvature, wherein said curved edge portion of said seal member contacts said electrolyte.

2. A fuel cell according to claim 1, wherein dimensions of said seal member satisfy the following expression:

$$H/W \leq 1.5$$

where W is a width of said columnar portion, and H is a height of said seal member from said base portion to said curved edge portion.

3. A fuel cell according to claim 1, wherein said columnar portion protrudes from said base portion with a draft angle.

4. A fuel cell, comprising:
   an electrolyte electrode assembly including a pair of electrodes and an electrolyte interposed between said electrodes; and
   metal separators for sandwiching said electrolyte electrode assembly,
   wherein a coolant supply passage, and a coolant discharge passage extend through said fuel cell in a stacking direction of said fuel cell;
   a coolant flow field is connected between said coolant supply passage and said coolant discharge passage on at least one of said metal separators along a surface of said electrode; and
   a seal member provided integrally on said metal separator, around at least one of said coolant supply passage and said coolant discharge passage,
   said seal member including:
   a substantially flat base portion formed integrally on said metal separator;
   a columnar portion, narrower than the base portion, protruding from said base portion, wherein the columnar portion is attached to the base portion by a curved transition region; and
   a curved edge portion provided on an end of said columnar portion, and having a predetermined curvature, wherein said curved edge portion of said seal member contacts said electrolyte.

5. A fuel cell according to claim 4, wherein dimensions of said seal member satisfy the following expression:

$$H/W \leq 1.5$$

where W is a width of said columnar portion, and H is a height of said seal member from said base portion to said curved edge portion.

6. A fuel cell according to claim 4, wherein said columnar portion protrudes from said base portion with a draft angle.

* * * * *